Sept. 24, 1957  N. E. ANDERSON ET AL  2,807,708
ARC WELDING APPARATUS AND METHOD
Filed June 28, 1954  2 Sheets-Sheet 1

*INVENTORS*
NELSON E. ANDERSON
WILLIAM J. GREENE
BY RAWLINS E. PURKHISER

Sept. 24, 1957   N. E. ANDERSON ET AL   2,807,708
ARC WELDING APPARATUS AND METHOD
Filed June 28, 1954   2 Sheets-Sheet 2

INVENTORS
NELSON E. ANDERSON
WILLIAM J. GREENE
BY RAWLINS E. PURKHISER

United States Patent Office 2,807,708
Patented Sept. 24, 1957

2,807,708
ARC WELDING APPARATUS AND METHOD

Nelson E. Anderson, Berkeley Heights, William J. Greene, Scotch Plains, and Rawlins E. Purkhiser, Springfield, N. J., assignors to Air Reduction Company, Incorporated, New York, N. Y., a corporation of New York Application June 28, 1954, Serial No. 439,676

14 Claims. (Cl. 219—137)

This invention relates to arc welding with a consumable electrode, and more particularly to the provision of means by which such welding can be performed with increased uniformity in the size and shape of the weld bead. The invention provides means whereby a weld bead of uniform size may be obtained preferably from a transformer-energized source of welding current and with a simple, constant speed feed for the welding electrode in spite of substantial fluctuations in line voltage and in spite of the minor variations in the spacing of the welding head from the workpiece which are in practice unavoidable with either manual or automatic welding apparatus but to which the arc is sensitive. Further by this invention these results are obtained while still retaining the starting and stabilizing advantages of a high open circuit voltage and a limited short circuit current.

The invention is particularly applicable to arc welding with a consumable electrode in which the arc is shielded with a stream of gas which may be an inert gas or a mixture of one or more gases, and in which the arc is a direct current arc.

While this invention will be described as applied to a transformer-rectifier type welder with a specific type of current control it should be recognized that the principles of the invention may be applied to welding machines of other design as well.

Welding machines employing rectifiers fed from a voltage transformer are of course well known, and they are for many purposes simpler and more convenient than welding machines of the rotating type. If however, there is a fall in the line voltage with which they are supplied, their output voltage falls also, and this may readily occur in such a degree as to change significantly and undesirably the nature of the weld obtained. Thus transformer-fed welding generators having a sharply falling volt-ampere characteristic are subject not only to the effects of line voltage fluctuations but to changes in arc length and penetration pattern upon a shift in the geometry of the relation between welding head and workpiece, and control mechanism operating on the rate of speed at which the electrode is fed to the arc is able to compensate only imperfectly therefor in view of the relatively large inertia of such a mechanical control system. Even so-called constant potential welding generators of the transformer-rectifier type exhibit the same sensitivity to line voltage fluctuations, although for a given line voltage their output voltage changes relatively little with current. They are further subject to the disadvantage of a low open circuit voltage and a very high short circuit current.

The present invention provides a welding apparatus of the transformer-rectifier type having independence of line voltage fluctuations over a wide range and combining the advantages of high open circuit voltage and limited short-circuit current with constancy in output voltage over an operating range, whereby uniformity in arc length and weld bead may be obtained over a range of welding currents incident to operation with a constant feed speed for the electrode wire and the inevitable variations in welding geometry.

In arc welding apparatus according to the invention there is employed a rectifier or series of rectifiers fed from a welding transformer of the type equipped with a control current winding which acts to govern the value of a reactance effectively in series with the secondary winding of the transformer for control of the welding current. The transformer and rectifier are used to maintain an arc between a workpiece and a consuming electrode fed to the arc at constant speed and shrouded at the arc by means of a gas shield. The arc is preferably of so-called reverse polarity, with the workpiece negative. For co-operation with the aforementioned elements of welding apparatus there are provided means which alter the current through the control winding of the transformer inversely with changes in arc voltage. With the electrode fed to the arc at constant speed, this results in stabilization of the welding operation at a single value of arc voltage and current in spite of fluctuations in line voltage. In addition the welding apparatus of the invention is characterised by remarkable constancy of arc length and penetration pattern in spite of small variations in spacing between the welding head and the surface of the workpiece at the location of the arc.

The invention will now be further described with reference to the accompanying drawings.

Figs. 3 and 4 are graphs useful in explaining the operation of the welding apparatus of Figs. 1 and 2; and Figs. 5–7 are cross sectional views illustrating the variations in weld seam cross section with arc length which can occur in the processes of arc welding with a consuming electrode to which the invention relates.

Figure 1:
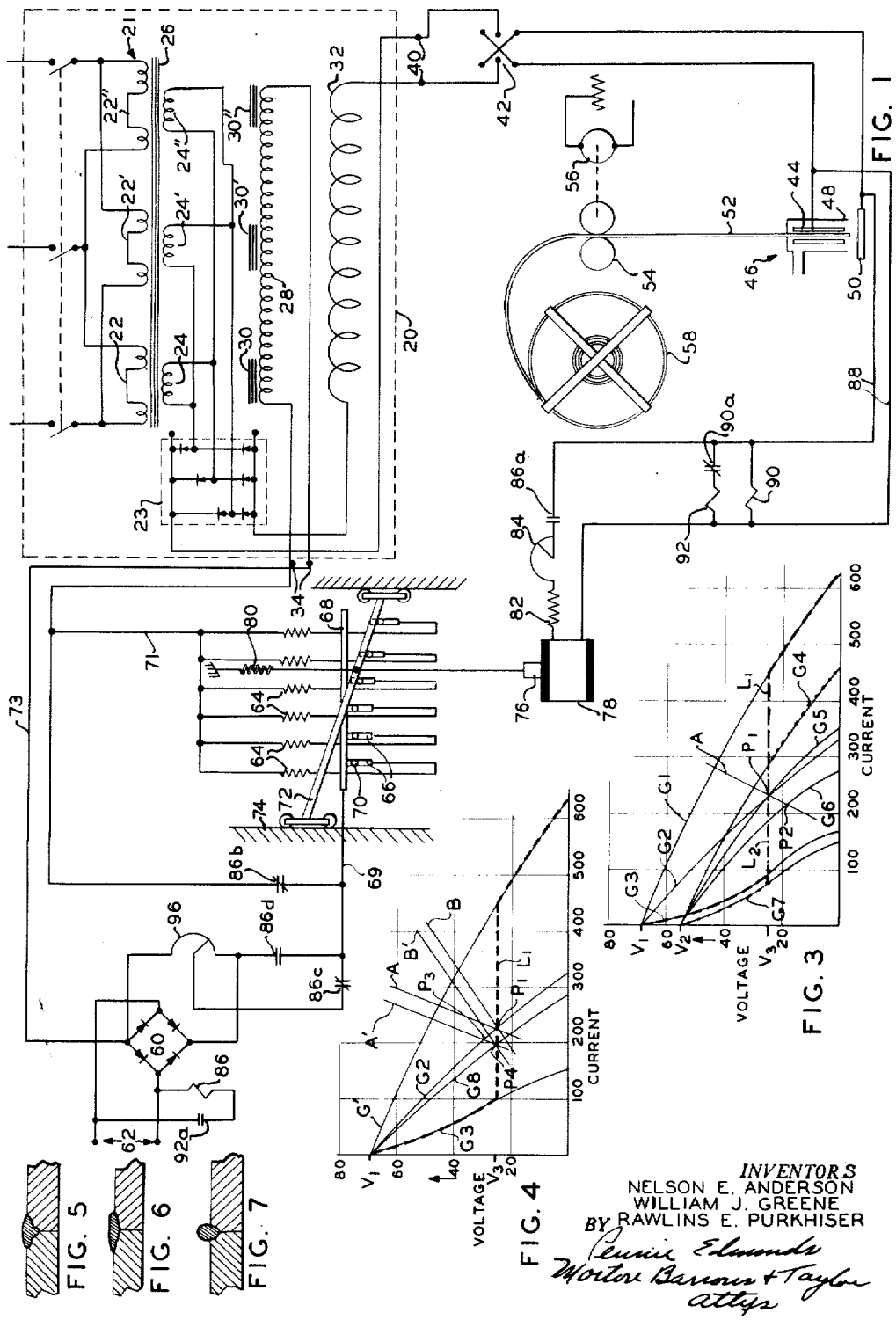
Fig. 1 is a schematic diagram of one form of welding apparatus in accordance with the present invention.

The welding apparatus of Fig. 1 includes a transformer-rectifier welding machine the components of which are shown enclosed within a dash-line box 20. The welding current furnished thereby at output terminals 40 may be fed through a polarity reversing switch 42 to a contact member or contact tube 44 in a welding head 46 and to a workpiece 50. Switch 42 is preferably set to make contact tube 44 positive and workpiece 50 negative. A consumable electrode 52 is supplied to the welding head through feed rolls 54 driven at an adjustably fixable constant speed by an adjustable speed motor 56. The electrode is supplied to the feed rolls from a storage reel 58.

The welding head 46 is preferably of the type employed in gas-shielded arc welding and as such includes a gas nozzle 48 through which a gas or a mixture of gases, usually inert, is supplied under pressure from a source not shown in order to emerge in an annular stream about the end of the electrode emerging from the contact member 44 so as to shroud the arc.

The welding machine 20 is generally of the type disclosed in United States Patent Number 2,644,109, issued June 30, 1953, to Allan C. Mulder. It includes a transformer generally indicated at 21, and a plurality of rectifiers indicated at the box 23. The transformer is shown as being of three-phase type with primary windings 22, 22' and 22" inductively coupled to secondary windings 24, 24' and 24" by means of a ferromagnetic core structure 26. The transformer includes in addition a control winding 28 which is coupled by means of ferromagnetic core structures 30, 30' and 30" with each of the secondary windings, but not with the primary windings, and which is energized with a varying direct current in accordance with the invention as will be presently set forth. The transformer may further include a second winding 32 which is connected in series with the rectifier output.

Flow of direct current through either or both of the windings 28 and 32 reduces the effective permeability of the core structures 30, 30' and 30", and this reduces the alternating flux which can be established in these cores by the current flowing in the secondary windings 24, 24' and 24". Consequently, with increase in saturation of the cores 30, 30' and 30", the voltages induced by the flux therein back into the secondaries in opposition to the voltages induced by the primary windings in the secondaries decline. The control cores 30, 30' and 30" thus operate as impedances in the secondary circuits of the transformer to limit the current flowing therein.

For the purposes of the invention, control of the welding operation, in particular of the length of the arc, is maintained by means of the winding 28, through which a current is passed the magnitude of which is varied inversely with fluctuations in arc voltage. In the embodiment of Fig. 1, the terminals 34 of the winding 28 are connected through a variable resistance to a source of direct current voltage. For example, a bridge rectifier 60 may be energized from any suitable source such as an alternating current lighting circuit 62 to develop direct current voltage for energization of the control current winding 28. In the embodiment of Fig. 1 the variable resistance connected in series with the winding 28 takes the form of a plurality of resistors 64, a greater or lesser number of which are connected in parallel with each other in accordance with fluctuations in the voltage at the arc.

To this end each of the resistors connects with a contact 66 which is spring loaded by means not shown to normally closed electrical contact relation with a conducting contact bar 68. The contact bar 68 is connected via a lead 69 and certain control wiring presently to be described to one output terminal of rectifier 60, whereas the ends of the resistors 64 opposite the contacts 66 are all connected together and to one end of the winding 28 via a lead 71. A lead 73 connects the other end of winding 28 with the opposite output terminal of rectifier 60. The contacts 66 are successively engageable at mechanical projections 70 thereon by an actuating bar 72 which may be made of insulating material and which is constrained by guides 74 to move parallel to itself, at an inclination to the length of bar 68, by means of the armature 76 of a solenoid 78. The bar 72 is loaded by a spring 80 against the action of the solenoid in a direction such as to permit all of the contacts 66 to assume their normally closed position. Hence the greater the current through the coil of solenoid 78 the smaller the number of contacts 66 which are closed, and the greater the effective resistance connected in series between the control current winding 28 and the source of voltage 69 therefor. The output of other types of welding machines may of course be controlled in an analogous manner.

The solenoid 78 has its coil connected through a current limiting resistor 82 and rheostat 84 and through a pair of relay contacts 86a across the welding terminals, i. e. the workpiece and contact tube by means of leads 88. The voltage existing across leads 88 may be referred to as the arc voltage, and the arc voltage desired to be maintained may be set at the rheostat 84. Three relays 90, 92 and 86 are provided for restricting adjustment of the effective resistance in series with winding 28 to times when an arc exists between the electrode and workpiece so that the welding machine is supplying welding rather than open circuit voltage. A relay 90 whose coil is connected across the leads 88 is provided with a single pair of normally closed contacts 90a which are in series with the coil of a relay 92 in a circuit also connected across leads 88. The coil of relay 90 is adjusted to open its contacts 90a when the arc voltage rises above the range encountered in welding. Energization of relay 92 is hence limited to times when the welding generator is operating under load. Relay 92 controls a single pair of normally open contacts 92a which control the application of voltage from any conventional source such as the lighting circuit 62 to the coil of relay 86. Relay 86 controls via its normally open contacts 86a the application of welding voltage to the solenoid 78. Relay 86 is provided in addition with normally closed contacts 86b and 86c and normally open contacts 86d. The normally closed contacts 86b operate to short-circuit the entire bank of resistors 64 when closed. Normally closed contacts 86c operate when closed to substitute for the full voltage output of rectifier 60 a fraction of that output selected at a potentiometer 96, and this fraction is then applied directly to the winding 28.

The operation of the system may now be described. Before the arc is struck, the output terminals 40 of the welding machine 20 are open circuited except for the current drawn by the coil of relay 90, which is very small. No current flows through winding 32. Under these circumstances the current flowing in the transformer primary windings 22, 22' and 22" is the magnetizing current only. The core structures 30, 30' and 30" are in a state of saturation governed by the magnitude of the current sent through winding 28 by the voltage taken from potentiometer 96. Since no current flows in the transformer secondary windings 24, 24' and 24", no alternating flux is generated in the cores 30, 30' and 30". The current through winding 28 is adjusted at potentiometer 96 to regulate to a suitable value, by control of the saturation of cores 30, 30' and 30", the back E. M. F. induced by those cores into the secondary windings, when the arc is struck, by the flux which the secondaries develop in those cores as soon as current is drawn at the arc.

When the voltage across leads 88 has fallen to a value within the welding range, i. e. when the arc is properly established, contacts 90a close and permit energization of relays 92 and 86. Solenoid 78 is energized by closure of contacts 86a. By opening of contacts 86b one or more of resistors 64 are inserted in series with the winding 28, according to the position assumed by the armature of the solenoid. By opening of contacts 86c and closure of contacts 86d, there is applied to the series combination of winding 28 and resistors 64 the full voltage output of the rectifier 60.

The rheostat 84 is adjusted to a value such that for a desired welding voltage and with normal line voltage into the welding generator and normal spacing between workpiece 50 and contact tube 44, the armature 76 of solenoid 78 assumes a position in which something like one-half the resistors 64 are connected in parallel. If the welding voltage should tend to increase, the armature 76 will be further attracted into the solenoid, reducing the number of resistors 64 effectively in circuit and increasing the resistance in series with the winding 28. The decreased current passed through winding 28 increases the impedance effectively in series with the transformer secondary windings and tends to decrease the welding current output of the machine to reduce the electrode burn-off rate and to restore the welding voltage to the previous (lower) value. Conversely upon a fall in welding voltage the solenoid armature is partially released against the stress of spring 80 and an increased number of shunt paths is provided through the resistors 64 to reduce the effective resistance in series with the winding 28. This increases the current sent through the control winding 28, reducing the impedance effectively in series with the transformer secondaries and increases the welding current output which increases electrode burn-off and increases the voltage at the welding terminals.

The behavior of the welding system of Fig. 1 may be further explained with reference to Figs. 3 and 4. In Fig. 3 there are plotted the volt-ampere characteristics of the welding machine 20 of Fig. 1 for a number of values of current through control winding 28, in each case for two values of line voltage applied to the primary of the transformer. The voltages of Fig. 3 are those existing between the contact tube and the workpiece. For any given line voltage the generator may be said to possess a family of characteristic curves, each curve pertaining to a particular value of current through the winding 28 assumed held constant over that curve. All of the curves of any one family begin at substantially the same open circuit voltage. All of the characteristic curves progress from a finite open circuit voltage to a finite short-circuit current.

For an open circuit voltage $V_1$ between the contact tube and workpiece, corresponding to a given line voltage into the transformer primaries, there are plotted in Fig. 3 three generator characteristic curves $G_1$–$G_3$. The extreme curves $G_1$ and $G_3$ of this family correspond respectively to the maximum and minimum values of current in the control winding 28, i. e. those corresponding to the extreme positions of the actuating bar 72 in Fig. 1. Curve $G_1$ is thus the characteristic curve which the machine 20 would exhibit if the bar 72 were held stationary in position to provide through each of the resistors 64 a current path between the rectifier 60 and winding 28. Curve $G_3$ conversely represents the volt-ampere characteristic which the machine would exhibit for the opposite extreme stationary position of the contact bar 72 in which only one resistor 64 is in circuit with winding 28. Potentiometer 96 is normally set at a value which produces a characteristic curve substantially identical to curve $G_3$ although this may be varied to alter somewhat the starting characteristics if desired.

For a lower line voltage producing an open circuit voltage $V_2$, there have been plotted four other characteristics $G_4$–$G_7$. Curves $G_4$, $G_6$ and $G_7$ correspond respectively to the same values of current through the control winding 28 as curves $G_1$, $G_2$ and $G_3$. Curve $G_5$ corresponds to a value of control winding current between those corresponding to curves $G_1$ and $G_2$.

In Fig. 3 there is also plotted what may be called a constant burn-off rate arc characteristic curve, i. e. the locus of arc voltages and current combinations which will sustain an arc between a given workpiece and an electrode wire of given size and composition fed at a given constant speed and with a given spacing between the workpiece and the contact tube through which the electrode passes to the arc, when the arc is of a given polarity and is shielded with a gas or gas mixture of given composition. Other constant burn-off rate arc characteristic curves similar to A and generally parallel thereto can be drawn for other burn-off, i. e. wire feed rates, the other factors mentioned being held constant. As indicated by curve A of Fig. 3, the constant burn-off rate arc characteristic curves in the operating range of practical interest rise in arc voltage with increasing current and are nearly straight.

The constant burn-off rate arc characteristic A is seen to intersect the welder characteristic $G_2$ in a point $P_1$ at a voltage level $V_3$ on curve $G_3$. Welder characteristic $G_2$ is one corresponding to a current through the control winding 28 approximately midway between the maximum and minimum obtainable values. It is seen that with this value of control winding current in the welding machine, with the value of line voltage corresponding to an open circuit voltage $V_1$ at the welding terminals and with the welding conditions at the welding head to which curve A corresponds welding will take place with the arc voltage and current specified by the ordinate and abscissa of point $P_1$ at the intersection of curves A and $G_2$. If now the line voltage supplied to the welder falls from the value for which the open circuit voltage of the welder is $V_1$ to a value for which the open circuit voltage is $V_2$ and if the value of current in winding 28 should remain unchanged, the operating point would shift from $P_1$ on curve A to $P_2$, the intersection of curve A with the welder characteristic $G_6$ which corresponds to the same control winding current as does the characteristic $G_2$. In the welding apparatus of the invention however the value of the current through the control winding 28 of the transformer is changed to hold the welding voltage stable at the level $V_3$ of operating point $P_1$. Effectively therefore upon the fall in line voltage assumed, the change in current through the control winding 28 occurring in the welding apparatus of the invention shifts the generator from the characteristic $G_3$ to a different characteristic $G_5$ which passes through the intersection of the constant burn-off rate arc characteristic A and the constant voltage level $V_3$. The welding operation is therefore unaffected by the change in line voltage.

The welding apparatus of the invention provides compensation not only for changes in line voltage but for changes in the spacing of the contact tube from the workpiece in such a manner as to preserve the arc length constant and thus to preserve the penetration pattern of the fused electrode metal and hence the cross section of the weld bead or seam obtained. Figs. 5–7 illustrate in a general manner the relation between arc length and the shape of the resulting weld seam for high current density arc welding with a consuming electrode employing a gas-shielded reverse polarity arc. Fig. 5 illustrates the seam cross section obtained with an arc of intermediate length such as is usually desired. Fig. 6 corresponds to a long arc, and Fig. 7 corresponds to a short arc. Figs. 5–7 show the desirability of maintaining uniformity in arc length if welds of uniform cross section are to be obtained.

The arc characteristic A was specified as corresponding to a given workpiece, electrode wire, wire feed speed, shielding gas, welding polarity and spacing between contact tube and workpiece. With a change in this spacing, the constant burn-off rate arc characteristic curve will shift. In particular with an increase in spacing between the contact tube and the workpiece, the constant burn-off rate arc characteristic will be shifted substantially parallel to itself toward lower values of current and higher values of voltage. If the welder conditions are left unchanged, the welding process is restricted to points on the generator characteristic previously obtaining. The welding operation will therefore be shifted to a new operating point defined by the intersection of the old generator characteristic with the shifted constant burn-off rate arc characteristic. This new operating point will in general correspond to a changed value of arc length so that the nature of the weld seam obtained will change as a result of the change in spacing between the contact tube and the workpiece. According to the invention however the current through the control winding of the welding machine is so adjusted as to cause the generator to take up a different generator characteristic whose intersection with the shifted constant burn-off rate arc characteristic defines an operating point characterized by the same arc length as that characterizing the operating point effective before the change in spacing between the welding head and the workpiece. This operation of the invention will be clarified by reference to Fig. 4.

In Fig. 4 the constant burn-off rate arc characteristic A and three generator characteristics $G_1$, $G_2$ and $G_3$ of Fig. 3 are reproduced. One additional generator characteristic $G_8$ is plotted for another and different value of current through the control winding 28. In Fig. 4 there is also plotted a curve A′ which represents the constant burn-off rate arc characteristic for the same welding conditions as those pertaining to curve A except that the spacing between the welding head and the workpiece is slightly increased. From Fig. 4 it is seen that with the generator restricted to the characteristic $G_2$, a change in the contact tube-workpiece spacing from that corresponding to the arc characteristic A to that corresponding to arc characteristic A′ will shift the operating point from $P_1$ to $P_3$.

However if by change in current through control winding 28 the generator is shifted to a characteristic $G_8$ which intersects the voltage level $V_3$ at $P_4$, the point of intersection of the voltage level $V_3$ with the now applicable constant burn-off rate arc characteristic $A'$, the arc will have the same length as before. This is true by virtue of the fact that, in gas-shielded electric arc welding with a consuming electrode, within the range of currents and voltages of interest, the shift in constant arc length arc characteristic which occurs with a change in workpiece-contact tube spacing is such as to cause the shifted constant arc length arc characteristic to intersect the shifted constant burn-off rate arc characteristic at the same voltage level. The properties of an arc can be plotted not only in the parameters of constant burn-off rate characteristic curves such as curves A and $A'$, along the length of which arc length changes, but also in terms of constant arc length curves such as the curves B and $B'$ of Fig. 4, along the length of which there may occur changes in burn-off rate and hence in the necessary wire feed speed. Curve B thus represents the locus of arc voltage and current combinations which will sustain an arc of a given length, for a given workpiece, electrode wire, shielding gas, arc polarity and workpiece-contact tube spacing. Curve B is in fact drawn for the same workpiece, electrode wire, gas, polarity and workpiece-contact tube spacing as those applying to curve A, and for the arc length obtaining at the point $P_1$ on curve A. When the workpiece-contact tube spacing is changed by an increase to the amount which shifts curve A to the position $A'$, curve B shifts toward lower currents and higher voltages to the position $B'$. Fig. 4 shows that the shifted constant arc length characteristic $B'$ intersects the shifted constant burn-off rate characteristic $A'$ at a point $P_4$ having the same voltage ordinate as the point $P_1$. Since the point $P_4$ lies on the curve $A'$, it represents an operating point for which the arc has the same length as at the point $P_1$. Consequently preservation of arc voltage in accordance with the invention in the face of changes in workpiece-contact tube spacing and with a constant wire feed speed results in preservation of an unchanged arc length.

According to the present invention therefore, the locus of volt-ampere relationships at the arc can be represented by a composite operating curve $L_1$ in Fig. 4. This curve follows a preselected drooping volt-ampere curve from the open circuit voltage value down to the preselected arc voltage value $V_3$. As welding current increases further this voltage remains substantially constant up to the current value represented by the current at voltage $V_3$ on the limiting characteristic curve $G_1$. The voltage is preferably maintained constant over a current range equal to about ⅓ the rated current at voltage below about 35 volts. From this point one curve $G_1$ the locus of volt-ampere relationships follows the limiting characteristic curve $G_1$ to a finite short circuit current. This same curve $L_1$ is reproduced in Fig. 3 along with a similar curve $L_2$ representing the locus of operating relationships for a line voltage that produces an open circuit voltage $V_2$. From this it can readily be seen that over the range of current in which these curves $L_1$ and $L_2$ coincide constant operating conditions can be maintained despite the drop in line voltage. All the advantages of high open circuit voltage, preferably above 50 volts, and limited short circuit current, preferably not more than 2.5 times the rated current of the machine, are retained. Rated current as used herein is the maximum current the machine can deliver at 60% duty cycle without overheating or other overloading. For inert gas shielded arc welding of the type contemplated herein, machines having a rated current of from 400 to 600 amperes are generally satisfactory. The initial drooping portion of this composite operating curve may be discontinuous if the resistance put in the circuit by potentiometer 96 is different than the maximum resistance afforded by the extreme position of the contact bar 72.

The principles represented by this novel operating characteristic curve are equally useful on welding machines of other designs than the machine described above, including both A. C. and D. C. machines. In other types of machines, as for example D. C. rotating machines where voltage and current drift due to changes in internal resistance caused by heating is a factor, the present invention compensates for such changes to maintain the welding conditions constant. Also since this invention maintains the welding conditions constant at the arc, as opposed to maintaining them constant at the terminals of the welding machine, it automatically compensates for a change in the welding cable being used and any other resistance that may be interposed between the welding machine and the arc. While in the preferred form of the present invention the locus of volt-ampere relationships is a constant voltage line for current values between the limiting characteristic curves $G_1$ and $G_3$ at that voltage it may under some conditions preferably be made to have a positive or negative slope.

The two aspects of the invention hereinabove discussed in connection with Figs. 3 and 4 are illustrated by the following data representative of results which have been achieved with apparatus of the form shown in Fig. 1. With a specified workpiece, electrode wire, wire feed speed, workpiece-contact tube spacing, shielding gas and reverse polarity arc, and with a line voltage of 460 volts to the welding generator, welding current measured 310 amperes, arc voltage 23.5 volts and arc length ¼ inch. Upon dropping the line voltage to 430 volts, welding current, arc voltage and arc length were unchanged. In contrast, the same welding head operated at the same welding conditions, i. e. same workpiece, electrode wire, wire feed speed, workpiece-contact tube spacing, gas and polarity, but fed from a transformer-rectifier welding generator of the prior art type, showed with 460 volts on the line supplying the welding generator a welding current of 320 amperes, 24.5 arc volts and an arc length of ¼ inch. With a reduction of the line voltage to 435 volts, welding current fell to 285 amperes, arc voltage to 21.7 volts and arc length to ⅛ inch.

Again with apparatus of the form shown in Fig. 1 and with a specified workpiece, electrode wire, wire feed speed, shielding gas, arc polarity, line voltage supplied to the welding generator and with a workpiece-contact tube spacing of ¾ inch, welding current was 180 amperes, arc voltage 24.5 volts and arc length ¼ inch. When the workpiece-contact tube spacing was increased to 1 inch, welding current fell to 160 amperes, but arc voltage and arc length were unchanged. In contrast, the same welding head operated at the same welding conditions but from a transformer-rectifier welding machine of prior art type showed with a ¾ inch workpiece-contact tube spacing a welding current of 185 amperes, an arc voltage of 26 volts and an arc length of ¼ inch. When the workpiece-contact tube spacing was increased to 1 inch, welding current fell to 175 amperes, arc voltage increased to 28 volts and the arc length increased from ¼ inch to ½ inch.

This invention has a further advantage in that it provides for terminating the arc without the formation of a crater. This result is achieved simply and easily by the operator slowly withdrawing the welding head away from the work to lengthen the arc. Inasmuch as this tends to increase the arc voltage the welding current is automatically reduced until it reaches a point at which the arc extinguishes. Such tapering off of the current prevents the formation of a crater.

Figure 2:
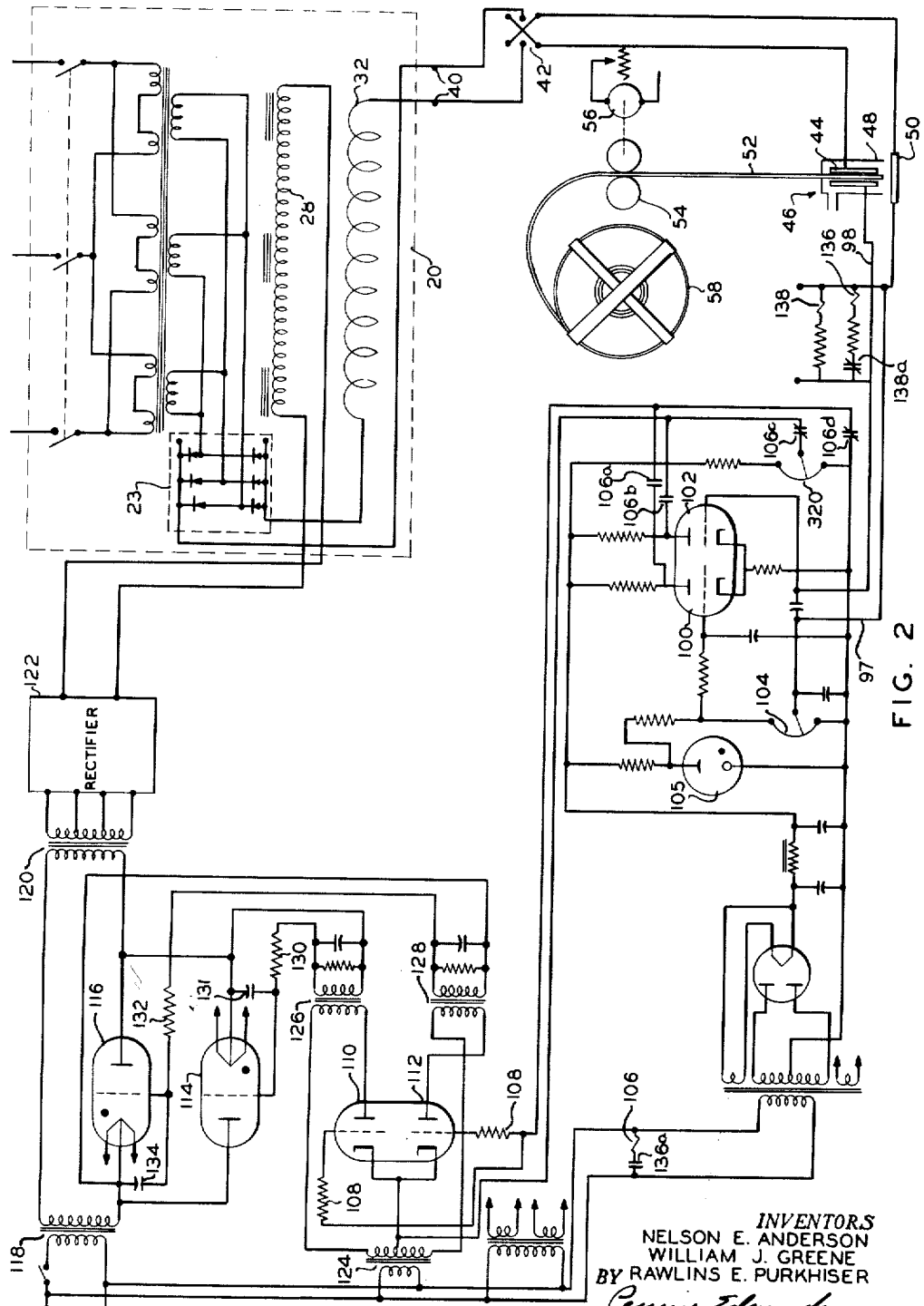
Fig. 2 is a diagram of another form of welding apparatus in accordance with the invention.

Another embodiment of the invention is illustrated in Fig. 2. In Fig. 2 the welding generator and welding head are the same as in Fig. 1 and are identified by the same reference characters. The means employed to adjust the current through the control winding 28 are however different. In the embodiment of Fig. 2 the welding voltage developed between the contact tube and workpiece is compared in a pair of amplifier tubes 100 and 102 (shown as two triodes in a common envelope) with a reference voltage set at a potentiometer 104 to which a stabilised D. C. voltage is applied from a voltage regulator tube 105. For reverse polarity welding the workpiece (negative) is connected to the movable tap on potentiometer 104 via a lead 97 while the contact tube (positive) is connected to the grid of tube 102 via a lead 98. The positive end of potentiometer 104 is connected through a limiting resistor to the grid of tube 100, and the voltage to which the arc is to be stabilized is the voltage between the grid of tube 100 and the top on potentiometer 104. This voltage may be referred to as the reference voltage.

The plate of tube 100 is connected through a normally open relay contact 106a and current limiting resistors 108 to the grids of a pair of amplifier tubes 110 and 112. The plate of tube 102 is connected through a normally open contact 106b to the cathodes of tubes 110 and 112.

Tubes 110 and 112 are connected to operate as control rectifiers for the development of a control voltage on the grids of two grid-controlled gas-filled rectifier tubes 114 and 116. These latter tubes are connected with their plate-cathode paths in parallel but oppositely poled in one side of the line connecting two transformers 118 and 120. Energy from a line 121 is passed through the transformers 118 and 120 in series under control of tubes 114 and 116 to supply a rectifier 122 whose D. C. output current is passed through the control winding 28 of the welding generator 20.

Voltages are applied between plates and cathodes of the rectifier tubes 110 and 112 in opposite phases of the excitation of transformer 118 by means of a transformer 124 to whose midtapped secondary the cathodes of these tubes are connected. The plate circuit of tube 110 includes a transformer 126 for the supply on each cycle of a negative control or bias voltage to the grid of the gas tube 114. A similar transformer 128 in the plate circuit of rectifier 112 develops a negative control or bias voltage for the gas discharge tube 116. The connection of transformers 118, 124, 126 and 128, on which dots adjacent the windings indicate cophasal primary and secondary winding terminals, is such that each of tubes 110 and 112 conducts on the half cycle of the excitation of line 121 during which its associated tube, 114 for tube 110 and 116 for tube 112, does not conduct. In the grid-cathode circuit of tube 114 a resistor 130 and a capacitor 131 permit the grid bias in tube 114 thus developed to be dissipated so that tube 114 comes into conduction at a phase during the positive half of its plate voltage cycle. Resistor 132 and capacitor 134 perform the same function for tube 116. The phases of their plate voltage cycles at which tubes 114 and 116 come into conduction thus depend upon the amount of conduction in tubes 110 and 112, respectively, and this conduction is governed by the difference in plate voltage, if any, at tubes 100 and 102 in which the welding and reference voltages are compared.

Contacts 136a of a relay 136 controlled by contacts 138a of a relay 138 to be energized only when the welder is operating under load govern energization of a relay 106 whose contacts 106a and 106b connect tubes 100 and 102 with tubes 110 and 112 during normal welding operations. Suitable starting currents for welding are established through normally closed relay contacts 106c and 106d by means of a potentiometer 320.

The arc voltage to be maintained is set at potentiometer 104. It is nearly but not quite equal to the drop in that potentiometer between the end thereof adjacent the grid of tube 100 and the tap thereon connected to lead 97. With a desired small inequality of the order of a fraction of a volt between the grids of tubes 100 and 102, there is developed in tubes 110 and 112 a bias level midway between the extremes of an operating range, so that the current in winding 28, which is controlled by those tubes via tubes 114 and 116, may be either increased or decreased for compensation of line voltage fluctuations and changes in contact tube-workpiece spacing in accordance with the invention as explained in terms of the embodiment of Fig. 1 by reference to Figs. 3 and 4.

The invention has been described in terms of two preferred embodiments thereof. Changes may be made from these embodiments without departing from the invention as defined in the appended claims.

We claim:

1. Arc welding apparatus comprising a welding head, means to supply a consumable electrode to said head at constant speed, a welding machine having a drooping volt-ampere characteristic and including a transformer having a saturable control core entirely independent of the primary winding and linked in direct inductive relationship with the secondary winding, means coupling the output of said welding machine to said electrode and to a workpiece, and means to alter the saturation of said core inversely with changes in arc voltage between said electrode and workpiece to maintain said arc voltage substantially constant between predetermined values of welding current.

2. Arc welding apparatus comprising a welding head, means to feed a consumable electrode at constant speed through said head, a welding power source having a drooping volt-ampere characteristic including a transformer having a saturable control core inductively coupled with the secondary winding of said transformer but inductively independent of the primary winding thereof, a rectifier connected across said secondary winding, means connecting the output of said rectifier to said electrode and workpiece, and means to alter the saturation of said core inversely with changes in arc voltage between said electrode and workpiece to maintain said arc voltage substantially constant between predetermined values of welding current.

3. Arc welding apparatus comprising a welding head, means to supply a consumable electrode to said head at constant speed, a power transformer having primary and secondary windings and a saturable control core magnetically independent of said primary winding but inductively coupled to said secondary winding, a coil linking said control core, a rectifier in circuit with said secondary winding, means connecting the output of said rectifier to said electrode and to a workpiece, a source of direct current, a variable resistance connected in a series circuit with said source and coil, a solenoid having its coil connected in shunt with said electrode and workpiece, and means linking the armature of said solenoid to said resistance whereby the value of said resistance declines with increasing current through the coil of said solenoid.

4. Arc welding apparatus comprising a welding head, means to supply a consumable electrode to said head at constant speed, a power transformer having a saturable control core magnetically linked with the secondary winding of said transformer and a coil linked with said core, a rectifier energized from the output of said secondary winding, means coupling the output of said rectifier to said electrode and to a workpiece, a source of direct current connected to said coil, a plurality of resistances, a solenoid having its coil connected in shunt with said electrode and workpiece, and means actuated by the armature of said solenoid for inserting a variable number of said resistances in a parallel connection between the coil linked with said core and said source, said number diminishing with increasing current through the coil of said solenoid.

5. Arc welding apparatus comprising a welding head, means to supply a consumable electrode to said head at constant speed, a power transformer having a saturable control core inductively coupled with its secondary winding, a coil wound on said core, a first rectifier energized from said secondary winding, means connecting a workpiece and said electrode to the output terminals of said first rectifier, a second rectifier having its output connected to said coil, a pair of grid control gas discharge tubes connected plate-to-cathode and cathode-to-plate in the input circuit to said second rectifier, a source of direct current reference voltage, two vacuum tubes each having a cathode, control grid and plate, means connecting the grid of one of said vacuum tubes and their cathodes across said source of reference voltage, means connecting a voltage proportional to the arc voltage developed between said electrode and workpiece between the cathodes of said vacuum tubes and the other of said grids, a pair of rectifier tubes each including a cathode, control grid and plate, means to supply an alternating voltage between plates and cathodes of said rectifier tubes in opposite phases from a source of alternating voltage, means coupling the cathodes of said rectifier tubes in parallel to the plate of one of said vacuum tubes and the grids of said rectifier tubes in parallel to the plate of the other of said vacuum tubes, a transformer coupling the plate circuit of each of said rectifier tubes with the grid-cathode circuit of one of said gas discharge tubes, and a resistor-capacity combination in each of said grid-cathode circuits.

6. The method of electric arc welding with a consuming wire electrode connected to a source of welding current which comprises striking an arc between said electrode and a metal workpiece connected to said source, feeding the consuming electrode toward the arc at a constant rate, and supplying current from said source to the electrode and workpiece at a voltage that decreases with increasing current to a preselected value of arc voltage, remains substantially constant at said preselected arc voltage with increasing current values to a limiting value of current, and decreases thereafter with increasing values of welding current to effectively limit thereby the short circuit current.

7. A gas shielded consuming electrode metal arc welding process comprising applying to an electrode and a workpiece a source of welding current having an open circuit voltage of at least 50 volts and a short circuit current of not more than 2.5 times the rated current of said source, establishing an arc between said electrode and said workpiece, feeding said electrode to said arc at a constant rate as metal is transferred across said arc from said electrode to said workpiece, shielding said electrode, said arc, and the weld puddle formed thereby with a following stream of shielding gas comprising essentially inert monatomic gas, and maintaining the voltage across said arc substantially constant over a preselected range of welding current values.

8. In an arc welding system including a welding head means to supply a consumable electrode to said head at a constant rate, and means to supply welding current to said electrode, the improvement which comprises supplying said welding current from a source having operating characteristics such that the output voltage decreases as the output current increases and which is adjustable through a range from a predetermined minimum current to a predetermined maximum current for any given output voltage, means to cause the current-voltage relationship to follow the locus of minimum current values from the open circuit voltage to a first preselected value of voltage, means to cause the current-voltage relationship to follow the locus of maximum current values from a second preselected value of voltage to short circuit conditions, and means to cause the current-voltage relationship to be linear between said first preselected value of voltage and minimum current and said second preselected value of voltage and maximum current.

9. In an arc welding system including a welding head, means to supply a consumable electrode to said head at constant rate, and means to supply welding current to said electrode, the improvement which comprises supplying said welding current from a source having operating characteristics such that the output voltage decreases as the output current increases and which is adjustable through a range from a predetermined minimum current to a predetermined maximum current for any given output voltage, means to cause the current-voltage relationship to follow the locus of minimum current values from the open circuit voltage to a preselected value of voltage, means to maintain said voltage substantially constant as the output current is increased to a maximum for said voltage, and means to cause the current-voltage relationship to follow the locus of maximum current values from said voltage to short circuit condition.

10. An arc welding system according to claim 9 in which the open circuit voltage of said welding current source is not less than 50 volts.

11. An arc welding system according to claim 9 in which the short circuit current of said source does not exceed 2.5 times the rated current.

12. An arc welding system according to claim 9 in which the preselected arc voltage can be maintained constant through a variation of welding current of at least ⅓ of the rated current output of the welding current source at preselected arc voltages below 35 volts.

13. The method of inert gas shielded electric arc welding a consuming wire electrode connected to a source of welding current which comprises striking an arc between said electrode and a metal workpiece connected to said source, feeding the consuming electrode toward the arc at a rate sufficient to maintain the arc, and supplying current from said source to the electrode and workpiece at a voltage that decreases with increasing welding current from open circuit voltage to a preselected value of arc operating voltage, and then remains substantially constant at said preselected arc operating voltage over a further range of welding current increases.

14. In an arc welding system including a welding head, means to supply a consumable electrode to said head at a constant rate, and means to supply welding current to said electrode, the improvement which comprises supplying said welding current from a source having operating characteristics limited by a spaced pair of drooping volt-ampere output curves, having means to preselect the arc starting characteristic curve within the limits of said spaced pair of curves, and having means after the arc is established to cause the arc voltage to be maintained substantially constant at a preselected arc voltage value between the value of welding current defined at said preselected voltage by said limiting characteristic curves.

References Cited in the file of this patent

UNITED STATES PATENTS

| | | |
|---|---|---|
| 2,039,044 | Wolfert | Apr. 28, 1936 |
| 2,433,827 | Callender | Jan. 6, 1948 |
| 2,518,222 | Carpenter | Aug. 8, 1950 |
| 2,559,513 | Palmer | July 3, 1951 |
| 2,591,582 | Monette | Apr. 1, 1952 |
| 2,620,465 | Giroz | Dec. 2, 1952 |

UNITED STATES PATENT OFFICE

CERTIFICATE OF CORRECTION

Patent No. 2,807,708                                      September 24, 1957

Nelson E. Anderson et al.

It is hereby certified that error appears in the printed specification of the above numbered patent requiring correction and that the said Letters Patent should read as corrected below.

Column 11, line 47, for "following" read --flowing--; column 12, line 33, after the syllable "ing" insert --with--.

Signed and sealed this 17th day of December 1957.

(SEAL)
Attest:
KARL H. AXLINE
Attesting Officer

ROBERT C. WATSON
Commissioner of Patents